United States Patent Office 3,151,275
Patented Sept. 29, 1964

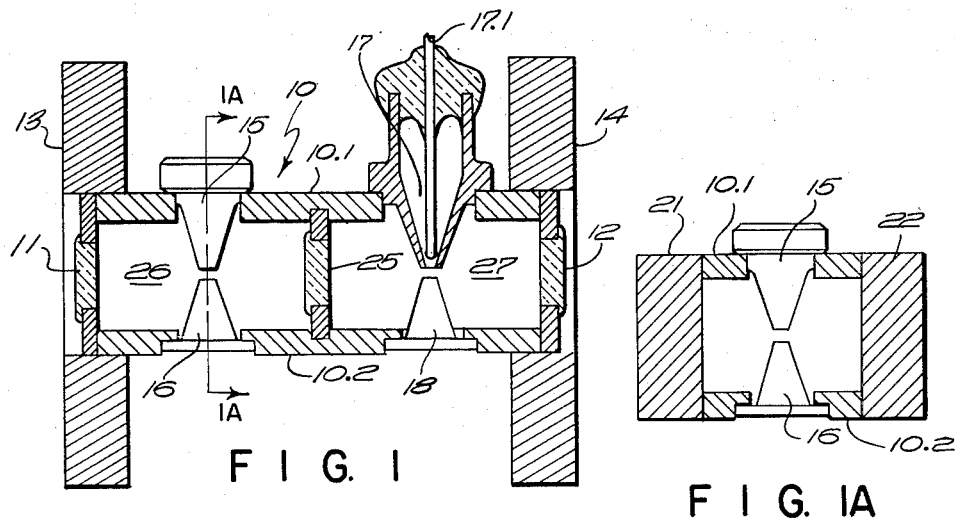
FIG. 1
FIG. 1A
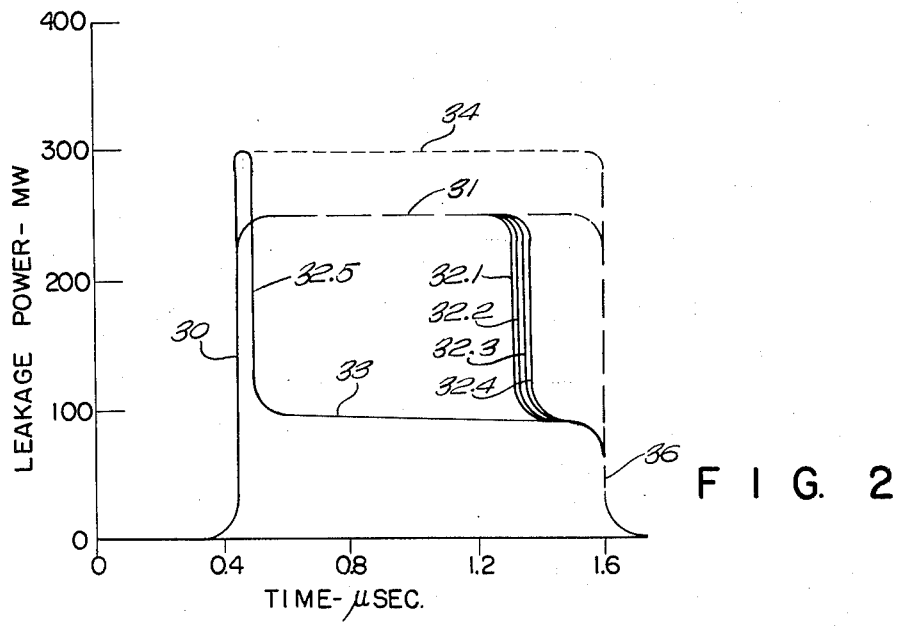
FIG. 2
INVENTOR.
HAROLD S. MADDIX

3,151,275
NOISE-FREE TR CELLS OPERABLE IN PRESENCE OF AN OUTPUT VSWR UP TO 3.0
Harold S. Maddix, Wenham, Mass., assignor to Microwave Associates, Inc., Burlington, Mass., a corporation of Massachusetts
Filed Aug. 26, 1960, Ser. No. 52,194
10 Claims. (Cl. 315—39)

This invention relates in general to microwave electromagnetic wave transmit-receive switch devices, commonly known as TR cells, and more particularly to stabilization of the breakdown across discharge electrodes therein under various operating conditions.

TR cells in common usage at the present time are made in the form of a section of waveguide hermetically sealed at each end with electromagnetic wave pervious gas impervious windows incorporating microwave iris structures adapted to pass electromagnetic wave energy in a given frequency band, one or more pairs of electric discharge electrodes providing discharge gaps axially spaced apart in the wave guide section and located where the voltage component of such energy will appear across them, and a fill of gas usually comprising a quantity of water vapor to facilitate the formation of an electric discharge across each gap when the magnitude of such voltage exceeds a prescribed value. Many characteristics of this discharge are of vital importance to designers and users of equipment, for example, pulse-echo type radar systems, in which TR cells are employed. Among these are recovery time, maximum leakage power (which can be subdivided into spike leakage energy or peak leakage power, and flat leakage power), abruptness of breakdown and stability of the discharge. The composition and pressure of the gas fill can be adjusted to control the recovery time and leakage power of the gaps in a given TR cell configuration. The leakage power is that power which leaks through or by the discharge electrodes of each gap when a discharge exists across them, and this is, of course, an important factor in the protection of sensitive following circuit elements which the TR cell is intended to protect. Recovery time is an important characteristic in radar system performance.

A common form of this type of TR cell has at least two pairs of discharge electrodes, providing at least two gaps, usually spaced approximately one-quarter wavelength (i.e., 90°) apart axially in the waveguide section relative to the guide wavelength of the energy intended to be propagated therein (although other spacings between the gaps are possible). A "keep-alive" electrode is frequently associated with at least one of these gaps to supply electrons to the gap and thereby assure voltage breakdown across the gap at a given voltage level of energy across the gap. A gap having such an electrode is termed a "keep-alive gap." TR cells constructed in this manner are customarily designed to insure a predetermined breakdown or "firing" sequence of the gaps when energy at an appropriate power or voltage level is propagating in the TR cell. If in a TR cell two adjacent gaps are 90° apart, the first-fired of these two gaps, in the fired condition, presents an essentially short-circuit termination one-quarter wave from the second gap, and, among other things, this represents the condition of minimum breakdown potential for the second gap.

In practical TR cells of the foregoing type having two gaps, only one of which is provided with a keep-alive electrode, the keep-alive gap is customarily located nearer the output end of the cell (i.e., the end intended for coupling to the receiver of a radar system) and the remaining gap (that having no keep alive electrode associated with it) is located nearer the input end, and is called the "input gap." This arrangement is intended to facilitate adjustment to assure that the keep-alive gap (i.e., the output gap) will fire first during operation when there is a common gas fill in the TR cell. In practice the keep-alive potential can be adjusted to assure that peak leakage power from the input gap will usually exceed the output gap breakdown power level, and this intention can be achieved. If then, in a given operating environment, the leakage power level from the input gap is always greater than the breakdown power level for the output (keep-alive) gap, the TR cell operates in a stable manner throughout each pulse of energy incident at the input. However, as I have discovered, and will hereinafter explain, the breakdown conditions of the output gap will vary widely, depending in part on the degree of match and phase displacement of the termination presented to it, with the result that the flat leakage portion of the input gap leakage pulse does not always satisfy the condition that it should exceed the breakdown power level for the output gap, notwithstanding such adjustment of keep-alive means associated with the output gap. Because of this unstable nature of the output gap breakdown process, it frequently happens that the output gap remains fired on one pulse and extinguishes during the flat leakage portion of the next pulse. This results in leakage power oscillations between the output gap and the input gap, and creates ultrasonic noise which deteriorates system performance. In some cases, this leakage power oscillation has a frequency which is one-half of the pulse repetition rate of the system incorporating the TR cell. Similar difficulty exists in TR tubes having more than two gaps, nothwithstanding precautions, (such as the use of keep-alive electrode means) to bring about a predetermined firing sequence during operation, because in any case the output gap will be subjected to the above-described conditions contributing to instability of its breakdown process.

It is an object of this invention to eliminate leakage power oscillations in TR cells over a wide range of operating conditions. A specific object of the invention is the prevention of leakage power oscillations by providing a multiple-gap TR cell in which the conditions governing the operation of the gaps are independently stabilized for each gap. Another specific object of the invention is to provide a two-gap TR cell, having keep-alive means provided for only one gap, in which the operation of each gap is stabilized under all intended operating conditions. A further object of the invention is to prevent random shifting of the gap discharge from one gap to another in TR cells.

A still further important object of the invention is to achieve the foregoing objects without adversely affecting other desired characteristics of TR cells. For example, I have discovered that the factors controlling recovery time are opposite to those controlling leakage power oscillations. It is one of my specific objects to eliminate leakage power oscillations without causing a deterioration in the recovery time.

According to the invention, a TR cell of the multiple-gap type is provided with an independent gas fill for each gap, and each gas fill is composed and adjusted for a specific range of values of breakdown power of the associated gap. More particularly, in a two-gap TR cell which has keep-alive means for one gap, the other gap being the input gap, the input gap gas fill is adjusted for minimum recovery time and maximum leakage power, and the keep-alive gap gas fill is chosen to be a gas combination with a lower electron attachment coefficient; this latter choice is possible because in such a TR tube the keep-alive sees only a fraction of the power incident on the input gap, and therefore has comparatively relaxed recovery time requirements and a lower breakdown power level. In a practical embodiment of such a two-gap TR cell, an additional electromagnetic wave pervious gas impervious window is hermetically sealed across the cell, between the two pairs of gap electrodes, and functions to separate the two separate gas fills and thereby effectively control leakage power oscillations.

The foregoing and further objects and features of the invention will become apparent from the following description of a preferred embodiment thereof and its operating characteristics. This description refers to the accompanying drawings, wherein:

FIG. 1 is a side sectional view of a TR cell according to the invention;

FIG. 1A is a cross section on line 1A—1A of FIG. 1;

FIG. 2 is a graph illustrating leakage power characteristics of a single gap under various conditions.

Figure 3:
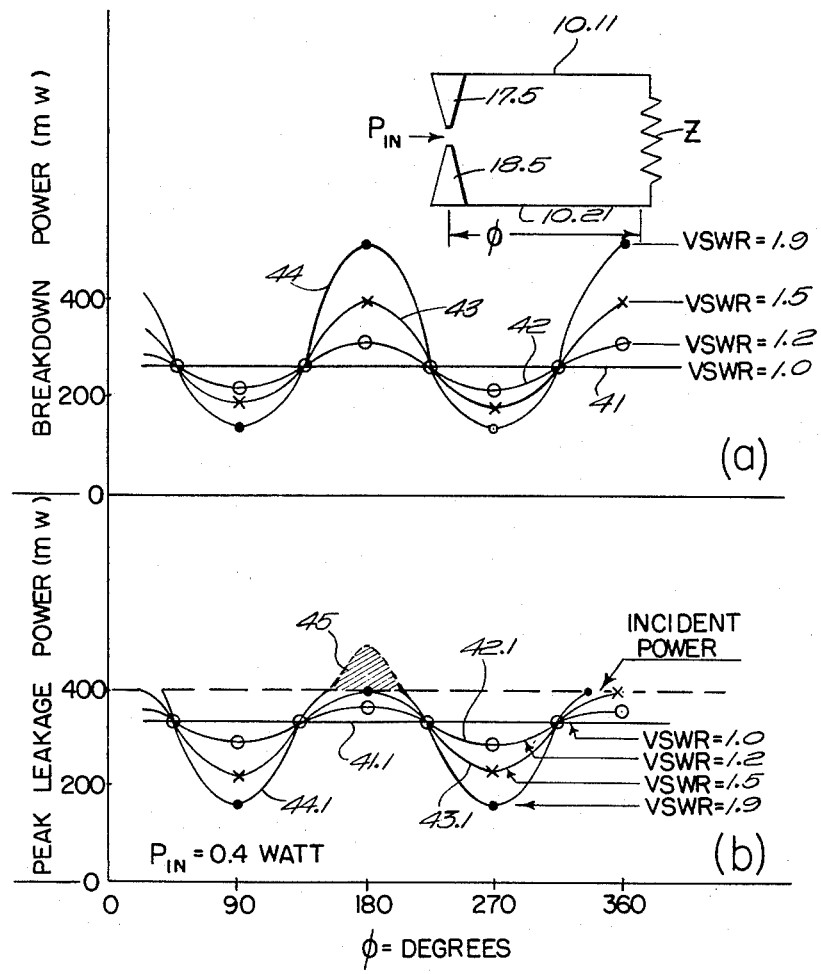
FIG. 3 is a set of graphs showing phase characteristics as a function of output load.

Referring now to FIGS. 1 and 1A, a section of rectangular waveguide 10 is hermetically closed at each end with a combined microwave iris and dielectric window structure 11, 12, of any known form. Flange means 13 and 14 of any known kind are provided at the ends of this section 10 for coupling purposes. A first pair of discharge electrodes 15, 16 is provided between the wide walls 10.1 and 10.2, respectively, of the waveguide 10 near the first window 11, and a second pair of discharge electrodes 17, 18, is similarly provided near the second window 12. Each of these electrodes extends toward the interior of the waveguide 10 through a hole in the wide wall of the waveguide on which it is mounted, and the members of each pair confront each other with a prescribed spacing between them.

As FIG. 1A illustrates, it is usual to provide a pair of inductive iris elements 21 and 22, which may be flat metallic sheets fitted through slots cut in the narrow wall and part-way into the wide walls and soldered in place, in association with each pair of discharge electrodes, to constitute therewith a parallel resonance circuit across the waveguide in the plane represented by the line 1A—1A in FIG. 1. The discharge electrodes function as the shunt capacitor of this circuit, in the unfired condition. This tuned circuit is usually located one-quarter guide wavelength from the first window 11, relative to the energy intended to be propagated.

The second pair of discharge electrodes 17, 18, also has associated iris elements (not shown), and is likewise usually located one-quarter guide wavelength from the second window 12. One electrode 17 of this pair is provided with a keep-alive electrode 17.1. According to usual practice, the tuned circuit represented by each pair of electrodes and associated iris elements may have a Q-factor of approximately 6 and the input and output windows 11 and 12, respectively, will then have a lower Q-factor of approximately 1.5 to 3, for example.

The two pairs of electrodes 15, 16 and 17, 18 are usually spaced one-quarter guide wavelength apart, relative to the energy intended to be propagated. (In this respect, FIG. 1 is not drawn to scale.) According to the usual terminology, the first window 11 is the input window, the first electrodes 15, 16 constitute the input gap, the second pair of electrodes 17, 18 constitute the keep-alive gap, and the second window 12 is the output window.

According to the invention, a third window 25 is sealed across the waveguide 10, between the input gap 15, 16 and the keep-alive gap 17, 18. This window separates the interior of the waveguide 10 into two hermetically sealed compartments 26 and 27. The input gap is in the first compartment 26 and the keep-alive is in the second compartment 27. The iris opening in the separator window 25 should have a Q-factor no greater than the openings in the input and output windows 11 and 12, respectively, in order to avoid the formation of an electric discharge across the separator window during operation.

The first compartment 26 is provided with a gas fill (not shown) which may be termed the "input gas fill," and which is composed and adjusted for minimum recovery time and a predetermined minimum leakage power. A suitable gas composition to assure 3 db. recovery time in the range from 0.1 to 0.2 microseconds and flat leakage power of approximately 400 milliwatts, for an input gap at X-band (approximately 9200–10,000 mc./sec.), in a TR cell intended for operation at a power level of approximately 20 watts, is water vapor at a pressure of 10 mm. of mercury.

The second compartment 27 is provided with a gas fill (not shown) which has a comparatively longer recovery time and consequently a lower breakdown power and lower flat leakage power than the input gas fill. This is due to the fact that the keep-alive gap 17, 18 sees only a fraction of the power incident on the input gap 15, 16 and has more relaxed recovery time requirements. A suitable gas composition for the keep-alive compartment 27 is a mixture of water vapor at a pressure of 2 mm. of mercury and argon at a pressure of 7 mm. of mercury.

For operating conditions in which a higher input gas fill pressure may be desirable, another gas, such as ammonia, may be added to the input gas fill. For example, since at room temperature water vapor at a pressure in excess of 18 mm. of mercury condenses into water droplets, an input gas fill including water vapor at a pressure not exceeding 16 mm. of mercury and ammonia at a higher pressure (e.g., 50 mm. of mercury) may be used. In this case, the output gas can include ammonia at about 3 mm. of mercury pressure, and argon at a pressure of 7 mm. of mercury.

FIG. 2 illustrates the shape of the leakage pulse through a single gap 15, 16 or 17, 18 during breakdown. To simplify the following discussion, this figure is first considered in connection with the keep-alive gap alone, and the discussion immediately following relates to the leakage power characteristics of the single gap 17, 18 as a function of incident power, assuming a constant terminating impedance. When the incident power increases from very low values the breakdown region is reached at a power level of approximately 250 milliwatts (mw.). Such a low power level, at which breakdown just starts, is represented by the horizontal dashed line segment 31. At this level, the trailing edge of the leakage pulse breaks away, as is illustrated with a series of vertical line segments 32.1, 32.2, 32.3 and 32.4, because of erratic response from one input pulse to the next. It frequently happens at such a low power level that one incident pulse causes the trailing edge to break away in one particular manner, and the next incident pulse causes it to break away in a different manner. The low incident power leakage pulse thus is a somewhat rectangular pulse defined by the initial vertical line 30 representing the leading edge, or rise portion, the dashed line horizontal line 31, and one of the rather indefinite lines 32.1 to 32.4 representing the fall to the flat leakage level 33.

If the power incident on this gap 17, 18 is gradually increased to the higher level represented by the short dashed line 34, the trailing edges of the pulse (represented by the series of vertical lines 32.1 to 32.4) moves closer to the leading edge or rise portion 30, and eventually blend into a single vertical line 32.5 which coincides with the incident power level at which the breakdown phenomenon is complete. At this level, the leakage pulse becomes a complex pulse consisting of the spike or peak leakage power region defined between the leading edge 30 and the stable trailing edge 32.5, and reaching the peak power level represented by the short dashed line 34, and the flat leakage power region following, which is defined by the solid horizontal line 33 and the final trailing edge 36. The flat leakage power is at a level 33 far below the initial breakdown power level represented by the long dashed line 31; it is relatively independent of further increase in the incident power level over a wide range.

The operaton described above with reference to FIG. 2 is reversible. If the incident power in a gap is reduced from the higher value 34 to the lower value 31, the leakage power pulse will gradually stretch out in time and resume its unstable trailing edge and "flatten out" at the breakdown power level.

The general characteristics of the leakage pulse through a gap as decribed above are true also for the input gap 15, 16 with the peak and flat leakage power at relatively higher levels due to the presence of a higher gas fill pressure (of water vapor or ammonia for example) in the first compartment 26.

Since the keep-alive gap is also the output gap, it sees, as its terminating impedance, the circuit which may be coupled to the TR cell at the output window 12. The terminating impedance for the keep-alive gap is thus beyond the control of the designer of the TR cell. Depending on the magnitude and phase of power reaching the keep-alive gap 17, 18 by reflection from its terminating impedance, the net electric field at the keep-alive gap can vary from one instant to the next, except of course in the special case where the keep-alive gap is matched to its termination. A changing net electric field at either gap can cause wide variations in the leakage power and breakdown power characteristics of the gap. With respect to the input gap 15, 16, stability of the net electric field at the gap is assured if the keep-alive gap 17, 18 is fired, for then the magnitude and phase (electrical distance) of the terminating impedance for the input gap are essentially fixed at prescribed values. Conditions which influence the net electric field at, and hence the discharge characteristics of, the keep-alive, or output, gap 17, 18, are described below with reference to FIG. 3.

In FIG. 3, the output gap is schematically represented by electrodes 17.5 and 18.5 connected across a line 10.11 and 10.21 which is terminated by an impedance Z displaced $\phi$ electrical degrees from the gap. The incident power upon the output gap, $P_{in}$, is the leakage power from the input gap 15, 16.

FIG. 3(a) illustrates the breakdown power in milliwatts for a typical keep-alive gap preceded by an input gap, as in FIG. 1, and having a breakdown power level between 175 and 400 milliwatts. Breakdown power values in milliwatts are represented along the vertical axis at the left-hand side of FIG. 3(a), and the distance $\phi$ between te gap 17.5–18.5 and the terminating impedance Z is represented in electrical degrees along the horizontal axis at the bottom of FIG. 3(a). Breakdown power values with respect to $\phi$ are represented for four different conditions, as follows:

Curve 41 represents the condition of a matched termination, for which the VSWR is 1.0; in this case no power is reflected from the termination Z to the gap, and the net field at the gap is solely the field due to the leakage power from the input gap;

Curve 42 represents the condition due to an impedance mismatch yielding a VSWR of 1.2; in this case the net field at the gap varies cyclically with $\phi$, being in phase with the incident power $P_{in}$, at 90° and 270°, and out of phase with $P_{in}$ at 180° and 360°;

Curve 43 represents the impedance mismatch which yields a VSWR of 1.5; and

Curve 44 represents the impedance mismatch which yields a VSWR of 1.9.

As is illustrated by curve 44, at $\phi=180°$, the incident power level required to cause breakdown of the gap is increased to more than 500 milliwatts due to reduction of the net field at the gap by reflected power at a VSWR=1.9. In the extreme case of a 100 percent reflecting shorting plate (not illustrated) displaced 180° from the gap, the net field at the gap would be so small that a gas discharge could not occur under any value of incident power.

FIG. 3(b) illustrates the phase characteristics of the peak leakage power of the keep-alive gap, for the same four VSWR conditions, in the presence of incident power (here represented as 400 milliwatts) which is not sufficient to fire the gap when the VSWR is 1.9 and $\phi=180°$. The four curves 41.1, 42.1, 43.1 and 44.1 in FIG. 3(b) correspond, respectively, to the curves 41, 42, 43 and 44 in FIG. 3(a). The curve 44.1 in FIG. 3(b) representing a terminating VSWR of 1.9 shows a flat top at $\phi=180°$ because the peak leakage power cannot exceed the incident power; referring to FIG. 2, this indicates that the time base of the leakage pulse of the keep-alive gap is widening, and the keep-alive discharge is starting to extinguish.

We consider now the case, as shown in FIG. 1, of two gaps 15, 16 and 17, 18 spaced apart 90°, electrically, with a keep-alive 17.1 in the output gap adapted to supply electrons in the gap (when suitably voltage biased) to insure that the output gap will break down first during operation. The 90° displacement is preferred because of bandpass considerations and because, as indicated above, 90° represents the condition requiring minimum breakdown power of the input gap when the output gap is fired. In the fired condition the keep-alive gap 17, 18 presents a short circuit termination with respect to the input gap 15, 16 which latter gap thus sees approximately the same termination under all conditions as long as the output gap remains fired. Variations in the termination of the output gap are then isolated from the input gap by the attenuation due to the output gap discharge. The leakage power characteristics of the input gap are thus stabilized.

On the other hand, as we have seen, the breakdown power of the output (i.e., keep-alive) gap depends on the degree of match and phase displacement of the output termination. If the leakage power from the input gap were always greater than the breakdown power of the keep-alive gap, the TR cell would operate in a stable manner. While in practice the peak leakage power from the input gap will usually exceed the keep-alive gap breakdown power level, the flat leakage power level of the input gap leakage pulse does not always meet this condition, and the keep-alive gap discharge may be extinguished during a pulse, depending on the net field conditions present at any given instant at the keep-alive gap. Because of the unstable nature of the breakdown process as explained above in connection with FIG. 2, it frequently happens that the keep-alive gap remains fired on one pulse and extinguishes during the flat leakage portion of the next pulse. This is illustrated by the shaded area 45 under curve 44.1, in FIG. 3(b), between $\phi=$ approximately 160° and 220°, assuming that the minimum flat leakage power from the input gap is at the incident power level of 400 milliwatts which is represented in this figure. This causes a flat leakage power oscillation in which the discharge shifts between the keep-alive gap and the input gap. The shifting can be random; if it occurs on every other pulse, it will be at a frequency which is one-half of the pulse repetition rate.

My invention prevents extinguishing the keep-alive gap in the flat leakage region of the input gap, over a wide range of input power and output termination conditions. As is disclosed above, a unique input gas fill, adjusted for minimum recovery time and maximum leakage power is provided in the input compartment 26 and a unique output gas fill having a relatively longer recovery time, and consequently a lower breakdown power and lower flat leakage power is provided in the keep-alive or output compartment 27. This enables precise adjustment of the amount of water vapor (or ammonia, for example) in the output compartment, where the amount of water vapor (or ammonia) is a critical parameter in controlling the balance between the desired low breakdown power level (to control oscillations) and short recovery time. Too much water vapor or ammonia, for example, gives short recovery times but this is accompanied by high output gap breakdown voltage, and oscillations. The opposite conditions obtain for too little water vapor or ammonia, for example. The relatively higher electron attachment coefficient of the input gas fill, accompanied by a constant termination for the input gap 15, 16, provides a more abrupt breakdown. As a result of this achievement, the input breakdown does not normally present any oscillation problem.

It is thus seen that the factors controlling recovery time are opposite to those controlling leakage power oscillations. By this invention, an ideal gas fill for each property is provided. The separating window 25 is chosen to have a low Q-factor, comparable to the Q-factor of the input and output windows, as is mentioned above. Preferably, hard brazing techniques are used in all stages of fabrication of the TR cell to maintain gas fill control during life and during ambient temperature fluctuations.

Life test for more than 280 hours of a TR cell similar to FIG. 1 were carried out at a power level sufficiently high to fire both gaps, and no leakage power oscillations occurred throughout the entire test. The 3 db recovery time on this TR cell showed an initial increase from 0.15 microseconds at the start to 0.30 microsecond at 16 hours, followed by a steady decrease to 0.08 microsecond at approximately 280 hours. These results with respect to suppression of oscillations and low recovery time are typical of a number of additional TR cells which have been made according to the invention and tested for shorter periods of time.

The TR cells built according to the invention will suppress leakage power oscillations to a maximum amplitude of 45 db below the main leakage pulse for a termination with a VSWR of 1.5. I believe that this represents a substantial step forward in the TR cell art, in that I have for the first time provided a structure which positively controls leakage power oscillations. The critical response of a TR tube output gap to reflected leakage power is such that prior TR cells can and do exhibit leakage power oscillations for terminations with a VSWR as low as 1.1. With my invention, this terminating VSWR limitation has been raised to about 1.7 at a 1 watt input power level, at the input gap, and about 3.0 at 20 watts input power at the input gap.

The embodiments of the invention which have been illustrated and described herein are but a few illustrations of the invention. Other embodiments and modifications will occur to those skilled in the art. For example, TR cells may be made with three or more gaps, each having its own unique gas fill provided according to the invention to assure that the minimum flat leakage power of each gap will be sufficient to maintain the next succeeding gap fired. Also, the invention is applicable to TR cells in which none of the gaps, or two or more gaps, have keep-alive electrode means, and with gas fill compositions other than those described herein. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

I claim:

1. TR cell comprising a section of hollow waveguide having an input end and an output end, at least first and second discharge electrode means coupled across said waveguide in regions axially spaced apart between said ends, said first discharge electrode means being the nearest to said input end, means separately hermetically enclosing the region surrounding each of said discharge electrode means, a separate gas fill in each of said enclosing means surrounding each of said discharge electrode means, said gas fills being relatively adapted to facilitate discharge of said second discharge electrode means prior to discharge of said first discharge electrode means in the presence of a pulse of input electromagnetic wave energy at a power level within the operating range of said cell and to maintain said second discharge electrode means in a fired condition throughout the flat leakage portion of the leakage pulse energy from said first discharge electrode means during said pulse, said gas fill surrounding said first discharge electrode means being adapted to minimize the recovery time and maximize the leakage power of said first discharge electrode means, and said gas fill surrounding said second discharge electrode means being adapted to provide therefor a relatively longer recovery time and a relatively lower flat leakage power than said first discharge electrode means such that in the presence of an input pulse of said energy at said power level the leakage pulse from said first electrode means has a flat leakage portion the power level of which is sufficiently high to maintain said second discharge electrode means in a fired condition throughout said incident pulse in the presence of an output VSWR up to approximately 1.7 to 3.0, depending substantially solely upon said input power level.

2. TR cell comprising a section of hollow waveguide having an input end and an output end, at least first and second discharge electrode means coupled across said waveguide in regions axially spaced apart between said ends, said first discharge electrode means being the nearest to said input end, means separately hermetically enclosing the region surrounding each of said discharge electrode means, a separate gas fill in each of said enclosing means surrounding each of said discharge electrode means, said gas fills being relatively adapted to facilitate discharge of said second discharge electrode means prior to discharge of said first discharge electrode means in the presence of a pulse of input electromagnetic wave energy at a power level within the operating range of said cell and to maintain said second discharge electrode means in a fired condition throughout the flat leakage portion of the leakage pulse energy from said first discharge electrode means during said pulse, said gas fill surrounding said first discharge electrode means being adapted to minimize the recovery time and maximize the leakage power of said first discharge electrode means, and said gas fill surrounding said second discharge electrode means being adapted to provide therefor a relatively longer recovery time and a relatively lower flat leakage power than said first discharge electrode means such that in the presence of an input pulse of said energy at said power level the leakage pulse from said first electrode means has a flat leakage portion the power level of which is sufficiently high to maintain said second discharge electrode means in a fired condition throughout said incident pulse in the presence of an output VSWR up to approximately 1.7 to 3.0, depending substantially solely upon said input power level the gas fill surrounding said first discharge electrode means being at a higher subatmospheric pressure than the gas fill surrounding said second discharge electrode means.

3. TR cell comprising a section of hollow waveguide having an input end and an output end, at least first and second discharge electrode means coupled across said waveguide in regions axially spaced apart between said ends, said first discharge electrode means being the nearest to said input end, means separately hermetically enclosing the region surrounding each of said discharge electrode means, a separate gas fill in each of said enclosing means surrounding each of said discharge electrode means, said gas fills being relatively adapted to facilitate discharge of said second discharge electrode means prior to discharge of said first discharge electrode means in the presence of a pulse of input electromagnetic wave energy at a power level within the operating range of said cell and to maintain said second discharge electrode means in a fired condition throughout the flat leakage portion of the leakage pulse energy from said first discharge electrode means during said pulse, said gas fill surrounding said first discharge electrode means being adapted to minimize the recovery time and maximize the leakage power of said first discharge electrode means, and said gas fill surrounding said second discharge electrode means being adapted to provide therefor a relatively longer recovery time and a relatively lower flat leakage power than said first discharge electrode means such that in the presence of an input pulse of said energy at said power level the leakage pulse from said first electrode means has a flat leakage portion the power level of which is sufficiently high to maintain said second discharge electrode means in a fired condition throughout said incident pulse in the presence of an output VSWR up to approximately 1.7 to 3.0, depending substantially solely upon said input power level the gas fill surrounding said first discharge electrode means including water vapor at a first subatmospheric pressure, and the gas fill surrounding said second discharge electrode means including argon at a second subatmospheric pressure lower than said first pressure.

4. TR cell comprising a section of hollow waveguide having an input end and an output end, at least first and second discharge electrode means coupled across said waveguide in regions axially spaced apart between said ends, said first discharge electrode means being the nearest to said input end, means separately hermetically enclosing the region surrounding each of said discharge electrode means, a separate gas fill in each of said enclosing means surrounding each of said discharge electrode means, said gas fills being relatively adapted to facilitate discharge of said second discharge electrode means prior to discharge of said first discharge electrode means in the presence of a pulse of input electromagnetic wave energy at a power level within the operating range of said cell and to maintain said second discharge electrode means in a fired condition throughout the flat leakage portion of the leakage pulse energy from said first discharge electrode means during said pulse, said gas fill surrounding said first discharge electrode means being adapted to minimize the recovery time and maximize the leakage power of said first discharge electrode means, and said gas fill surrounding said second discharge electrode means being adapted to provide therefor a relatively longer recovery time and a relatively lower flat leakage power than said first discharge electrode means such that in the presence of an input pulse of said energy at said power level the leakage pulse from said first electrode means has a flat leakage portion the power level of which is sufficiently high to maintain said second discharge electrode means in a fired condition throughout said incident pulse in the presence of an output VSWR up to approximately 1.7 to 3.0, depending substantially solely upon said input power level the gas fill surrounding said first discharge electrode means including ammonia and water vapor at first and second respective subatmospheric pressures, and the gas fill surrounding said second electrode means including ammonia and argon at third and fourth respective pressures lower than either of said first and second pressures.

5. TR cell comprising a section of hollow waveguide having an input end and an output end, at least first and second discharge electrode means coupled across said waveguide in regions axially spaced apart between said ends, said second discharge electrode means being the nearer to said output end and having keep-alive means, means separately hermetically enclosing the region surrounding each of said discharge electrode means, a separate gas fill in each of said enclosing means surrounding each of said discharge electrode means, said gas fills being relatively adapted to facilitate discharge of said second discharge electrode means prior to discharge of said first discharge electrode means in the presence of a pulse of input electromagnetic wave energy at a power level within the operating range of said cell and to maintain said second discharge electrode means in a fired condition throughout the flat leakage portion of the leakage pulse energy from said first discharge electrode means during said pulse said gas fill surrounding said first discharge electrode means being adapted to minimize the recovery time and maximize the leakage power of said first discharge electrode means, and said gas fill surrounding said second discharge electrode means being adapted to provide therefor a relatively longer recovery time and a relatively lower flat leakage power than said first discharge electrode means such that in the presence of an input pulse of said energy at said power level the leakage pulse from said first electrode means has a flat leakage portion the power level of which is sufficiently high to maintain said second discharge electrode means in a fired condition throughout said incident pulse in the presence of an output VSWR up to approximately 1.7 to 3.0, depending substantially solely upon said input power level.

6. TR cell comprising a section of hollow waveguide having an input end and an output end, at least first and second discharge electrode means coupled across said waveguide in regions axially spaced apart between said ends, said second discharge electrode means being the nearer to said output end and having keep-alive means, means separately hermetically enclosing the region surrounding each of said discharge electrode mans, a separate gas fill in each of said enclosing means surrounding each of said discharge electrode means, said gas fills being relatively adapted to facilitate discharge of said second discharge electrode means prior to discharge of said first discharge electrode means in the presence of a pulse of input electromagnetic wave energy at a power level within the operating range of said cell and to maintain said second discharge electrode means in a fired condition throughout the flat leakage portion of the leakage pulse energy from said first discharge electrode means during said pulse, said gas fill surrounding said first discharge electrode means being adapted to minimize the recovery time and maximize the leakage power of said first discharge electrode means, and said gas fill surrounding said second discharge electrode means being adapted to provide therefor a relatively longer recovery time and a relatively lower flat leakage power than said first discharge electrode means such that in the presence of an input pulse of said energy at said power level the leakage pulse from said first electrode means has a flat leakage portion the power level of which is sufficiently high to maintain said second discharge electrode means in a fired condition throughout said incident pulse in the presence of an output VSWR up to approximately 1.7 to 3.0, depending substantially solely upon said input power level the gas fill surrounding said first discharge electrode means being at a higher subatmospheric pressure than the gas fill surrounding said second discharge electrode means.

7. TR cell comprising a section of hollow waveguide having an input end and an output end, at least first and second discharge electrode means coupled across said waveguide in regions axially spaced apart between said ends, said second discharge electrode means being the nearer to said output end and having keep-alive means, means separately hermetically enclosing the region surrounding each of said discharge electrode means, a separate gas fill in each of said enclosing means surrounding each of said discharge electrode means, said gas fills being relatively adapted to facilitate discharge of said second discharge electrode means prior to discharge of said first discharge electrode means in the presence of a pulse of input electromagnetic wave energy at a power level within the operating range of said cell and to maintain said second discharge electrode means in a fired condition throughout the flat leakage portion of the leakage pulse energy from said first discharge electrode means during said pulse, said gas fill surrounding said first discharge electrode means being adapted to minimize the recovery time and maximize the leakage power of said first discharge electrode means, and said gas fill surrounding said second discharge electrode means being adapted to provide therefor a relatively longer recovery time and a relatively lower flat leakage power than said first discharge electrode means such that in the presence of an input pulse of said energy at said power level the leakage pulse from said first electrode means has a flat leakage portion the power level of which is sufficiently high to maintain said second discharge electrode means in a fired condition throughout said incident pulse in the presence of an output VSWR up to approximately 1.7 to 3.0, depending substantially solely upon said input power level, the gas fill surrounding said first discharge electrode means including water vapor at a first subatmospheric pressure, and the gas fill surrounding said second discharge electrode means including argon at a second subatmospheric pressure lower than said first pressure.

8. TR cell comprising a section of hollow waveguide having an input end and an output end, at least first and second discharge electrode means coupled across said waveguide in regions axially spaced apart between said ends, said second discharge electrode means being the nearer to said output end and having keep-alive means, means separately hermetically enclosing the region surrounding each of said discharge electrode means, a separate gas fill in each of said enclosing means surrounding each of said discharge electrode means, said gas fills being relatively adapted to facilitate discharge of said second discharge electrode means prior to discharge of said first discharge electrode means in the presence of a pulse of input electromagnetic wave energy at a power level within the operating range of said cell and to maintain said second discharge electrode means in a fired condition throughout the flat leakage portion of the leakage pulse energy from said first discharge electrode means during said pulse, said gas fill surrounding said first discharge electrode means being adapted to minimize the recovery time and maximize the leakage power of said first discharge electrode means, and said gas fill surrounding said second discharge electrode means being adapted to provide therefor a relatively longer recovery time and a relatively lower flat leakage power than said first discharge electrode means such that in the presence of an input pulse of said energy at said power level the leakage pulse from said first electrode means has a flat leakage portion the power level of which is sufficiently high to maintain said second discharge electrode means in a fired condition throughout said incident pulse in the presence of an output VSWR up to approximately 1.7 to 3.0, depending substantially solely upon said input power level, the gas fill surrounding said first discharge electrode means including ammonia and water vapor at first and second respective subatmospheric pressures, and the gas fill surrounding said second electrode means including ammonia and argon at third and fourth respective pressures lower than either of said first and second pressures.

9. TR cell comprising a section of hollow waveguide having an input end and an output end, dielectric microwave pervious window means hermetically sealed across each of said ends, first and second discharge electrode means coupled across said waveguide in regions axially spaced apart between said ends, said second electrode means being the nearer to said output end, third dielectric microwave pervious window means hermetically sealed across said waveguide between said electrode means to provide first and second hermetically sealed compartments containing, respectively, said first and second electrode means, and a separate gas fill in each of said compartments, said gas fills being relatively adapted to facilitate discharge of said second electrode means prior to discharge of said first electrode means in the presence of a pulse of microwave energy incident upon said input end at a power level within the operating range of said cell and to maintain said second electrode means in a fired condition throughout the flat leakage portion of the leakage pulse energy from said first electrode means during said pulse, said gas fill surrounding said first discharge electrode means being adapted to minimize the recovery time and maximize the leakage power of said first discharge electrode means, and said gas fill surrounding said second discharge electrode means being adapted to provide therefor a relatively longer recovery time and a relatively lower flat leakage power than said first discharge electrode means such that in the presence of an input pulse of said energy at said power level the leakage pulse from said first electrode means has a flat leakage portion the power level of which is sufficiently high to maintain said second discharge electrode means in a fired condition throughout said incident pulse in the presence of an output VSWR up to approximately 1.7 to 3.0, depending substantially solely upon said input power level.

10. TR cell comprising a section of hollow waveguide having an input end and an output end, dielectric microwave pervious window means hermetically sealed across each of said ends, first and second discharge electrode means coupled across said waveguide in regions axially spaced apart between said ends, said second electrode means being the nearer to said output end and having keep-alive means, third dielectric microwave pervious window means hermetically sealed across said waveguide between said electrode means to provide first and second hermetically sealed compartments containing, respectively, said first and second electrode means, and a separate gas fill in each of said compartments, said gas fills being relatively adapted to facilitate discharge of said second electrode means prior to discharge of said first electrode means in the presence of a pulse of microwave energy incident upon said input end at an input power level within the operating range of said cell and to maintain said second electrode means in a fired condition throughout the flat leakage portion of the leakage pulse energy from said first electrode means during said pulse, said gas fill surrounding said first discharge electrode means being adapted to minimize the recovery time and maximize the leakage power of said first discharge electrode means, and said gas fill surrounding said second discharge electrode means being adapted to provide therefor a relatively longer recovery time and a relatively lower flat leakage power than said first discharge electrode means such that in the presence of an input pulse of said energy at said power level the leakage pulse from said first electrode means has a flat leakage portion the power level of which is sufficiently high to maintain said second discharge electrode means in a fired condition throughout said incident pulse in the presence of an output VSWR up to approximately 1.7 to 3.0, depending substantially solely upon said input power level.

References Cited in the file of this patent

UNITED STATES PATENTS

| | | |
|---|---|---|
| 2,791,720 | Lesch | May 7, 1957 |
| 2,819,425 | Dutt | Jan. 7, 1958 |

OTHER REFERENCES

"Microwave Duplexers" (Smullin), published by McGraw-Hill Book Co., New York, 1948, page 188 relied on.